J. STEELE.
Thill Coupling.

No. 108,062. Patented Oct. 4, 1870.

Witnesses
John Marshall
Henry W. Weeks

John Steele
Inventor

UNITED STATES PATENT OFFICE.

JOHN STEELE, OF SHELDON, ILLINOIS.

IMPROVEMENT IN SHAFT-COUPLINGS FOR VEHICLES.

Specification forming part of Letters Patent No. 108,062, dated October 4, 1870.

*To all whom it may concern:*

Be it known that I, JOHN STEELE, of Sheldon, in the county of Iroquois, and in the State of Illinois, have invented a new and Improved Thill or Shaft Coupling; and I do hereby declare that the following is a full, clear, and exact description thereof, reference being had to the annexed drawings, making a part of this specification, in which like letters of reference refer to like parts, and in which—

Figure 1:
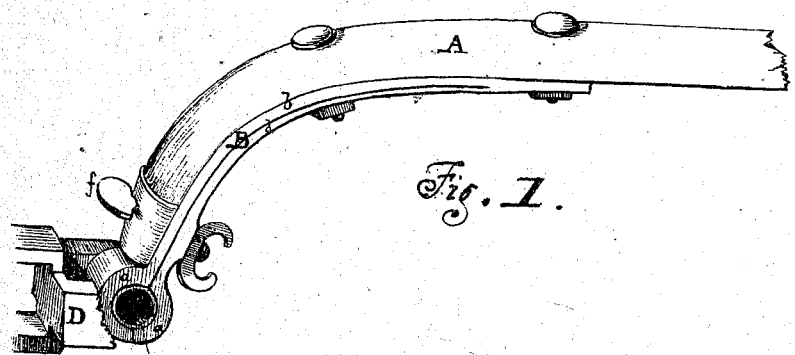
Figure 2:
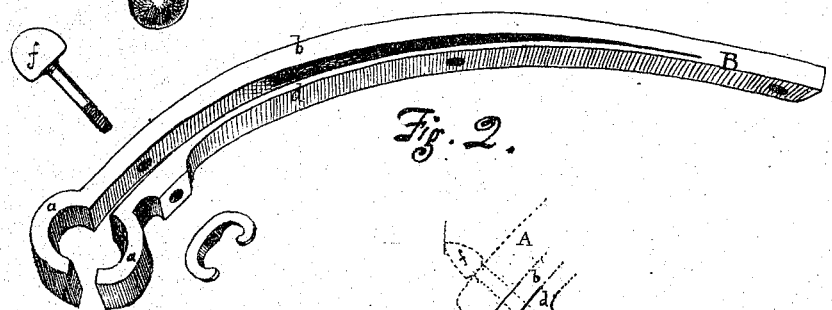
Figure 3:
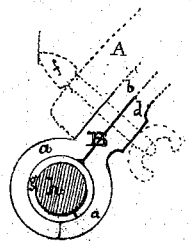

Figure 1 represents a perspective view; Fig. 2, a perspective view of the strap and eye separate from the thill; Fig. 3, an end view of the eye, showing the rubber or leather cushion between the eye and the hinge bolt.

This improvement relates to that class of thill-couplings in which the eye of the strap or coupling is made in two halves or parts, which, when closed by screw-nuts, retain the small bolt uniting the strap and thill to the vehicle, so as to form a quick and easy plan for the attachment or removal of the thills, the bolt forming the connection being wrapped with leather or rubber, so as to prevent all rattling or jarring of the coupling.

Now, my invention consists in splitting or dividing the strap far enough up toward the end to allow of a sufficient separation of the parts of the eye in attaching and removing the thills, so as to require only one screw in closing or fastening the strap, thus enabling the latter to be attached or removed with greater facility, and, besides, effecting a saving in cost of construction in the using of only one screw instead of two, as in those heretofore constructed, which, having the strap in two separate parts, of course require two screws, and consequently more handling in fastening and attaching the thills.

A represents the shaft or thill; B, the strap; $b$, the upper half of the same, terminating in a half or portion of the usual eye, $a$; $d$, the lower half of the strap, terminating in the corresponding half or portion of eye, the division being near the plane of the axis of the bolt-hole or socket. $f$ is a thumb-screw or bolt, or similar device, for drawing the two halves or parts of the strap or eye together; $g$, a cushion or fender, of leather, rubber, or other similar material, around the coupling-bolt $h$; D, the hinge on the vehicle, which receives the eye within its jaws.

The strap is split, as shown in the drawings, being divided far enough up toward the end to allow of a sufficient separation of the parts of the eye in attaching or removing the thills to the vehicle, the thumb-screw bringing the eye well together.

Further description or explanation is deemed unnecessary, as the drawings fully illustrate the improvement.

I claim as my invention—

In a thill coupling for vehicles, the divided eye $a\ a$ and divided strap B, the latter being a continuation of the longitudinal division of the former, and constructed either partially split or divided, substantially as described.

In testimony that I claim the foregoing I have hereunto set my hand this 15th day of October, 1869.

JOHN STEELE.

Witnesses:
HENRY W. WELLS,
JOHN MARSHALL.